UNITED STATES PATENT OFFICE.

ALVERDO S. ALBERT, OF IONE, WASHINGTON.

MILK-SHAKE-POWDER COMPOUND.

1,388,084.      Specification of Letters Patent.      Patented Aug. 16, 1921.

No Drawing.      Application filed October 14, 1919. Serial No. 330,682.

*To all whom it may concern:*

Be it known that I, ALVERDO S. ALBERT, a citizen of the United States, residing at Ione, in the county of Pend Oreille and State of Washington, have invented certain new and useful Improvements in Milk-Shake-Powder Compounds, of which the following is a specification.

This invention relates to improvements in fillers for milkshakes.

The primary object of the invention is to provide a powder for use in the preparation of what is termed a milkshake for increasing the bulk and consistency of the milkshake imparting thereto a thick, rich, appetite satisfying quality and enhancing its desirability as a drink.

Another object of the invention is to provide a composition for use in the preparation of a milkshake which will not only be harmless but will increase the nutritive value of the drink.

Other objects will be in part obvious and in part pointed out hereinafter.

The invention accordingly consists in the peculiar composition which will be exemplified in the following description and which will be indicated in the appended claim.

Heretofore in the preparation of milkshakes in order to provide the desired consistency and bulk it has been usual to use in connection therewith a quantity of ice cream or half milk and half cream. The present invention contemplates the provision of a very fine powder which when placed in a milkshake and stirred up will provide the desired consistency and bulk imparting thereto a rich appetite satisfying quality without the use of ice cream or other substances.

But two ingredients are used in this filler and these are ground extremely fine. I have found it desirable to use two-thirds gelatin with one-third gum acacia, or substantially in the proportion of two to one.

The gelatin and gum acacia as before mentioned are ground very fine and mixed and a certain quantity thereof is placed in the milkshake for increasing the consistency bulk thereof and rendering it more palatable.

What I claim is:

A milk shake filler for imparting to the drink a thick, rich, appetite satisfying quality comprising a powder composed of two parts of pulverized gelatin and one part gum acacia.

In testimony whereof I affix my signature hereto.

ALVERDO S. ALBERT.